Jan. 9, 1934.  L. SHAPIRO  1,942,575

ELECTROSTATIC SHIELDING MATERIAL

Filed Nov. 3, 1922  2 Sheets-Sheet 1

Inventor
L. SHAPIRO
By his Attorney Ira J Adams

Jan. 9, 1934.  L. SHAPIRO  1,942,575
ELECTROSTATIC SHIELDING MATERIAL
Filed Nov. 3, 1922   2 Sheets-Sheet 2

Inventor
L. SHAPIRO
By his Attorney Ira J Adams

Patented Jan. 9, 1934

1,942,575

UNITED STATES PATENT OFFICE 1,942,575

ELECTROSTATIC SHIELDING MATERIAL

Lazarus Shapiro, New York, N. Y., assignor to Radio Corporation of America, a corporation of Delaware Application November 3, 1922. Serial No. 598,731

18 Claims. (Cl. 250—16)

The present invention relates to an arrangement for preventing undesired electrostatic or capacitative coupling between electrical devices or parts thereof. It is important to avoid this effect in many types of apparatus, for example, particularly in the following; alternating current bridges, in which undesired capacities may impair the accuracy; telephone apparatus, in which the exact balancing of artificial lines for two-way operation requires freedom from stray capacity; radio apparatus, in which stray capacitative coupling may cause various difficulties, such as interference from short wave signals in reception and objectionable oscillations in amplifiers.

In such cases it is usual to shield one part from another by interposing a continuous grounded equipotential surface in the form of a grounded metallic sheet or wall between the parts, or to enclose the parts of the apparatus in metal cases which serve to fix the capacities of the parts to ground and to shunt away all capacitative currents between the parts. In many cases, however, the parts to be shielded are coils or contain coils, and the metallic shielding may cause highly objectionable eddy current losses and magnetic reactions as a closed path is provided for the eddy currents. In fact, at high frequencies the metallic walls, under circumstances, may be as effective for magnetic shielding as for capacitive shielding.

The object of my invention is to provide an equipotential surface or shield substantially free from eddy current losses and magnetic reactions. A further object of my invention is to provide a shield material which is conveniently adapted to enclose objects of various sizes and shapes which are to be shielded and to completely exclude other objects. A still further object of my invention is to provide a shield material or tape which can be conveniently applied to any form or shape of coil, and which can be made a standard manufactured product.

In accordance with my invention the shield is made from a number of conductors which form a substantially continuous good conducting surface which is therefore a substantially equipotential surface. The conductors are usually connected together at only one point so that the surface may be electrically continuous and may be grounded to fix its potential while still maintaining freedom from closed circuits. However, in many instances it is possible and desirable to electrically connect the conductors at other selected points, if the resulting closed circuits are located in positions in which they do not interlink the magnetic flux of the article to be shielded. In the claims I have used the term "free from closed eddy current paths" to include surfaces in which closed circuit paths are present as well as those in which no closed circuit paths are present, provided the closed current paths are so disposed that no eddy currents will be generated therein.

The novel features which I believe to be characteristic of my invention are set forth in the appended claims. The invention itself, however, both as to its organization and use, will best be uderstood by reference to the following description of illustrative embodiments taken in connection with the drawings in which:

Figure 1:
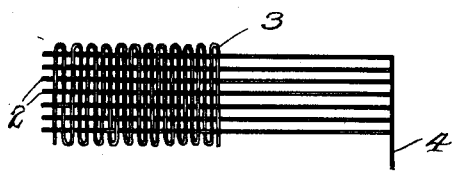
Fig. 1 is a fragmentary view of a section of shielding tape made in accordance with the invention.

A convenient embodiment of my invention utilizes the shield in the form of an elongated woven strip or tape of fabric as shown in Figure 1. The fabric comprises a number of parallel conductors 2 which are preferably closely spaced and of small diameter. These conductors or wires are usually insulated from each other throughout their length in any appropriate manner and connected to ground at one point; for example, by means of a ground conductor 4 soldered to each of the conductors of the strip. In this manner a surface having a plurality of conducting paths is secured which is free from closed circuit eddy current paths. However, it will provide a good conducting, substantially equipotential surface such as is necessary for elimination of capacitive coupling. In certain cases the conductors may be electrically connected at additional points if the resultant closed circuit in the surface does not interlink the flux. These additional connections may be made in a variety of ways depending on the article and an illustration by way of example will be given hereinafter.

It may not be necessary always to connect the strands of conducting material in the shielding fabric together in order to form an equipotential surface. In some cases the electrostatic capacity between the strands, lying close together for a considerable length, may be sufficient to establish an equipotential surface. In such cases it will be sufficient to ground any one of the strands, and the connection of the remaining strands would be merely an added precaution. Such cases are likely to arise at extremely high frequencies, and at such frequencies the inductance of the length of shielding tape employed would be of greater consequence in establishing undesirable impedances between different parts of the shield than the absence of a conductive connection between the strands. It may then be highly desirable to ground many points suitably chosen along the length of the shielding tape, and it may be helpful, though not essential, to connect the strands together.

In Fig. 1 the warp threads 2 of the fabric are made of fine copper wires and the woof threads 3 are made of cotton or other insulating thread. As the wires are likely to get into electrical contact at undesired points they are preferably insulated in any ordinary manner (enamel, silk, cotton, rubber) although the woof threads themselves serve to space the wires apart and thereby to insulate the wires when the fabric is perfect.

Figure 2:
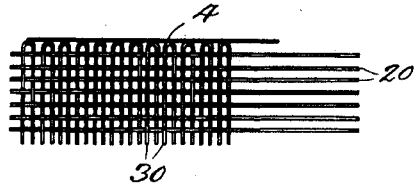
Figs. 2 and 3 are modified forms of shielding tape.

I may also make both the warp and the woof of insulated conductors or the warp 20 of insulating thread and the woof 30 of conducting material and connect a point or points of these conductors to a grounding wire as shown in Fig. 2; but I prefer to make the warp of conductors and the woof of insulating threads as above described and illustrated.

Figure 3:
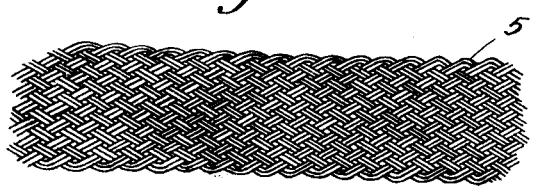

In Fig. 3 a shield of braided wire 5 is shown. All of the threads may be insulated conductors or a portion of them be conducting and the remainder non-conducting.

When the shield is made in the form of elongated tape it may be conveniently applied by wrapping around the part to be shielded in a manner somewhat like that used in applying ordinary insulating tape. It will be evident that it may be readily made to conform to any desired shape.

Figure 5:
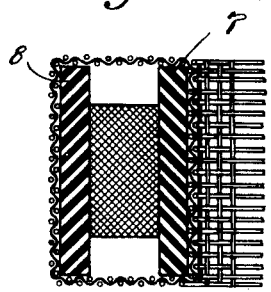
Figure 7:
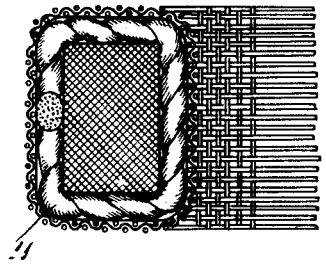
Figure 6:
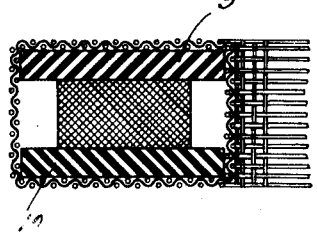

In Figs. 5, 6 and 7 this is shown by way of example where the shield is wrapped around a circular inductance or coupling coil for high-frequency currents. Although in some cases the shielding material may be placed or wrapped directly against the winding, it is usually desirable, especially when dealing with high frequencies, to space the shield from the part to be shielded by means of a dielectric. Unless this is done the shield has been found in some cases to increase the distributed capacity of the coil, for example, and to cause a dielectric loss or otherwise injuriously affect the characteristics of the coil.

The coil is surrounded by a suitable spacing dielectric, which may be, for example, air, a layer of thick cloth, corrugated cardboard, paper, a wrapping of twine, etc. The shielding material is then applied over the dielectric. In the case of a circular coil, spacing rings or tubes of insulating material 7, 8 may be fitted inside and outside the coil and the shielding material wrapped around the spacing rings, as shown in Fig. 5. In Fig. 6 flat rings 9, 10 parallel to the surface of the coil are used and in Fig. 7 a wrapping of twine 11 is shown for spacing the shield from the coil.

Figure 9:
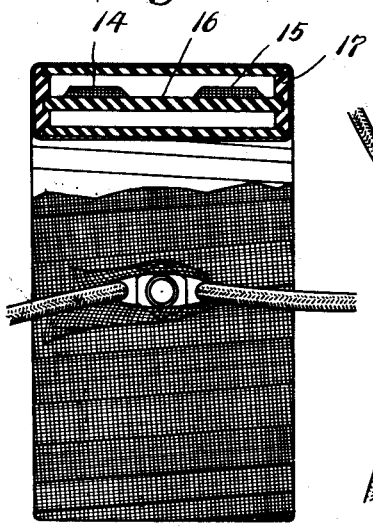
Figs. 9 and 10 are side and plan views respectively of a coiled shielded in accordance with the invention.
Figure 10:
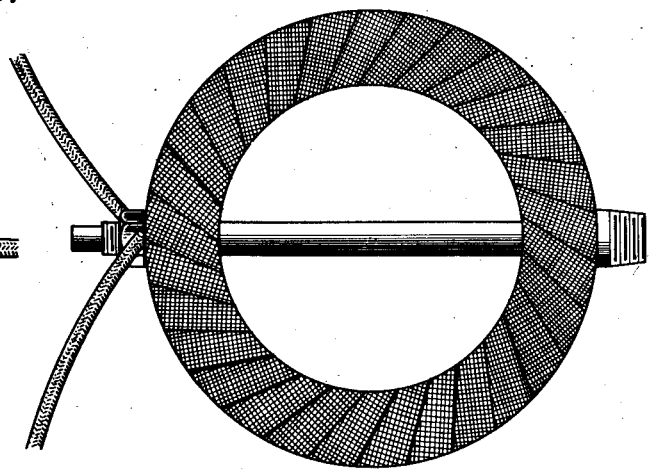

In Figs. 9 and 10 a completely wrapped coil is shown in which the winding consisting of two parts 14, 15 is wound on an insulating ring 16 which is mounted in a hollow enclosing ring 17 by means of which the windings are spaced from the shield on all sides.

Figure 4:
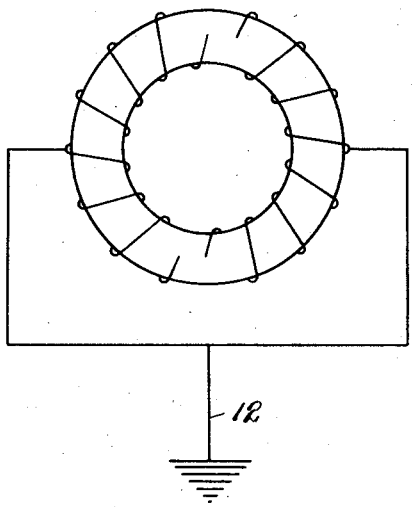

Usually tape of sufficient width is used so that relatively few turns are required to cover an ordinary coil, in order that the tape winding shall have a negligible inductance and resistance. If the coil to be shielded is very large, as, for instance, a receiving loop, or if even a very small inductance is objectionable, this may be further decreased by winding the shield in sections and separately grounding the sections, so that they are virtually in parallel instead of being in series. In Fig. 4 a coil is shown wrapped with a shield divided into two parts which are separately grounded by conductors soldered to the middle of each strip, thus providing four paths in parallel from shield to ground. For facility and clearness of illustration the tape encircling the coil is represented by a single line in this figure. Each of the parts is connected to the grounding conductor 12 and the ends are left open.

Figure 8:
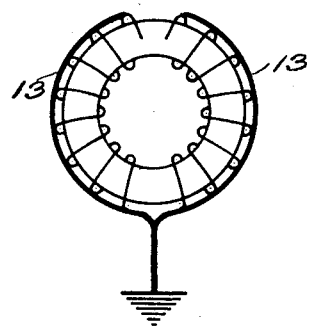
Figs. 4, 5, 6, 7 and 8 illustrate certain details of particular methods of application.

Although this arrangement provides an efficient shield free from eddy current paths the conductors may also be connected at other points to form closed circuits if these closed circuits interlink only a negligibly small portion of the flux of the coil. This is illustrated for example, in Fig. 8, where an open ring conductor 13 is electrically connected to each turn of two parts which are wrapped around the coil, the ring being open at the points connected to the open ends of the two parts of the tape wrapping. In this arrangement each turn is grounded thus providing a large number of very short paths in parallel.

In practice for effective shielding it is found that the separation of the strands should not exceed approximately five times the diameter of the strands, and that the distance between the shielding material and the shielded part should be several times the separation between the strands. The diameter of the individual conductors must, of course, be small enough to avoid material eddy current losses in them.

Having described my invention, what I claim is:

1. An electrostatic shielding material comprising a fabric containing conducting filamentary strands held together by binding material and insulated from each other to form a plurality of separate open circuit conducting paths, and means for connecting the strands to form an equipotential surface.

2. An electrostatic shielding material comprising a woven fabric containing threadlike conducting strands, said strands forming a plurality of separate open circuit conducting paths, and a ground connection for said paths.

3. The combination of an electrical part to be electrostatically shielded and an electrostatic shield separated therefrom by an insulating space, said shield comprising a fabric comprising filamentary conductors wrapped around said part and a ground connection for said shield.

4. The combination of an electrical part to be electrostatically shielded and an electrostatic shield consisting of woven conducting elements insulated from each other adapted to form a shielding surface, said surface being divided into a plurality of sections and a ground connection for each of said sections.

5. The combination of an electrical part to be electrostatically shielded and an electrostatic shield in the form of a plurality of sections of woven tape wrapped around said part, said tape containing a plurality of conducting elements and a ground connection for each of said sections.

6. An electrostatic shielding material for high frequency apparatus comprising a woven fabric containing conducting filamentary strands insulated from each other to form a plurality of separate open circuited conducting paths each of said conducting paths being connected together at a predetermined point for fixing the potential thereof.

7. In radio frequency apparatus the combination of a part carrying radio frequency currents and electrostatic shielding material therefor in the form of a woven tape containing filamentary conducting strands.

8. In combination, a part carrying radio frequency currents and electrostatic shielding material therefor comprising a fabric having a warp and a woof, one of which is conducting.

9. In a system carrying radio frequency currents, the combination with a part charged with such currents of electrostatic shielding material therefor comprising a fabric having a warp and a woof, one of which is made of conductors insulated from each other said conductors being connected together at a predetermined point for fixing the potential thereof.

10. In radio frequency apparatus, the combination of a part carrying radio frequency currents and electrostatic shielding material therefor comprising a fabric having a warp and a woof, one of which is made of conductors covered with insulating material.

11. In a system carrying radio frequency currents, the combination of a part charged with such currents and electrostatic shielding material therefor comprising an elongated flexible tape having a warp and a woof, one of which is made of conductors insulated from each other said conductors being connected together at a predetermined point for fixing the potential thereof.

12. In a system carrying radio frequency currents, the combination of a part charged with such currents, and an electrostatic shielding material therefor comprising a fabric having a warp and a woof, said warp being made of conductors and said woof being made of insulating thread.

13. In combination, a part carrying radio frequency currents and electrostatic shielding material therefor comprising a fabric having a warp and a woof, said warp being made of conductors covered with insulating material and said woof of insulating thread.

14. In combination, a part carrying radio frequency currents and electrostatic shielding material therefor comprising a fabric wrapped around said part containing conducting strands insulated from each other substantially throughout their length said strands being connected together at a predetermined point for fixing the potential thereof.

15. In means for shielding a coupling inductance for high frequency currents, the combination with said inductance of a screen consisting of a plurality of cooperating insulated conductors bound together intermediate their ends by insulating material, each conductor being electrically connected to ground at one end and open circuited at the other end, said screen permitting the free passage of magnetic lines to and from said inductance while preventing electrostatic transfer of energy to and from said inductance.

16. A system for electrostatically shielding electrical parts of radio apparatus from each other but permitting passage of magnetic lines of force between said parts comprising an electrostatic shield, said shield consisting of a plurality of electrical conductors disposed in the same plane and each insulated one from another throughout their length and bonded together intermediate their ends and placed at ground potential at one end and open circuited at the opposite end.

17. In a system for coupling electrical circuits the combination of a radio frequency coupled including a winding, an electrostatic shield extending adjacent said winding, said shield being composed of a plurality of parallelly extending conductors each insulated and spaced one from the other throughout their length by material which retains the conductors in position, whereby magnetic lines of force may thread through said shield and affect said winding, one end of each of said conductors being connected to ground for preventing electrostatic transfer of energy to or from said winding.

18. In a system for coupling electrical parts the combination of an inductive coil, and a sheet of material composed of a plurality of closely adjacent metallic conductors, each covered with insulating material, said material serving to unite said conductors together, said conductors being positioned adjacent said coil, said conductors being grounded at one end and open-circuited at the opposite end for eliminating eddy currents in said shield and for preventing the transfer of electrostatic energy to said coil while permitting transfer of electromagnetic energy to and from said coil.

LAZARUS SHAPIRO.

---

CERTIFICATE OF CORRECTION.

Patent No. 1,942,575.            January 9, 1934.

LAZARUS SHAPIRO.

It is hereby certified that error appears in the printed specification of the above numbered patent requiring correction as follows: Page 1, line 69, for "uderstood" read understood; page 2, line 99, for the word "oil" read coil; page 3, line 104, claim 17, for "coupled" read coupler; and that the said Letters Patent should be read with these corrections therein that the same may conform to the record of the case in the Patent Office.

Signed and sealed this 23rd day of June, A. D. 1936.

(Seal)                                     Leslie Frazer
                                           Acting Commissioner of Patents.